US010259594B2

(12) United States Patent
Yu et al.

(10) Patent No.: US 10,259,594 B2
(45) Date of Patent: Apr. 16, 2019

(54) APPARATUS AND METHOD FOR RECOVERING AND LAUNCHING UNMANNED AERIAL VEHICLE

(71) Applicant: POSTECH ACADEMY-INDUSTRY FOUNDATION, Pohang-si, Gyeongsangbuk-do (KR)

(72) Inventors: Son Cheol Yu, Pohang-si (KR); Ju Hyun Pyo, Yangsan-si (KR); Han Gil Joe, Gyeongsangnam-do (KR); Hyeon Woo Cho, Pohang-si (KR); Byeong Jin Kim, Chungcheongnam-do (KR)

(73) Assignee: POSTECH ACADEMY-INDUSTRY FOUNDATION, Pohang-si, Gyeongsangbuk-do (KR)

( * ) Notice: Subject to any disclaimer, the term of this patent is extended or adjusted under 35 U.S.C. 154(b) by 299 days.

(21) Appl. No.: 15/372,287

(22) Filed: Dec. 7, 2016

(65) Prior Publication Data

US 2017/0183106 A1    Jun. 29, 2017

(30) Foreign Application Priority Data

Dec. 23, 2015   (KR) .......................... 10-2015-0185480

(51) Int. Cl.
*B64F 1/04*   (2006.01)
*B64F 1/02*   (2006.01)
(Continued)

(52) U.S. Cl.
CPC .............. *B64F 1/025* (2013.01); *B63G 8/001* (2013.01); *B64C 39/024* (2013.01); *B64D 45/08* (2013.01);
(Continued)

(58) Field of Classification Search
CPC .. B64F 1/025; B64F 1/007; B64F 1/04; B64C 39/024; B64C 2201/18; B64C 2201/201; B64C 2201/182; B63G 2008/002
See application file for complete search history.

(56) References Cited

U.S. PATENT DOCUMENTS 2,741,445 A  *  4/1956  Weyerbacher ............ B64F 1/04
                                                        244/110 A
8,336,816 B2 * 12/2012  Miller ....................... B64F 1/06
                                                        244/63

(Continued)

FOREIGN PATENT DOCUMENTS

JP        2007-223491 A      9/2007

*Primary Examiner* — Valentina Xavier
(74) *Attorney, Agent, or Firm* — Morgan Lewis & Bockius LLP (57) ABSTRACT

Provided is an apparatus for recovering and launching an unmanned aerial vehicle. The apparatus for recovering and launching the unmanned aerial vehicle includes a main body that includes a storage space in which the unmanned aerial vehicle is stored, an inclined platform that forms an inclined surface which is connected between a fixed bar fixed in the main body and a moving bar moved to an opened upper portion of the main body and collides with the unmanned aerial vehicle induced to approach a side of the main body, a band member of which one end is connected to the moving bar and the other end is rolled up in a roll shape and stored in the storage space of the main body, and a driving motor that rotationally drives a rotor circumscribed with the band member in a normal direction or reverse direction, so that the moving bar is moved with respect to the fixed bar, wherein the inclined surface is formed by unfolding the inclined platform, the unmanned aerial vehicle colliding with the inclined surface is recovered to the storage space, and then the inclined platform is folded.

19 Claims, 7 Drawing Sheets

(51) Int. Cl.
  *B63G 8/00* (2006.01)
  *B64C 39/02* (2006.01)
  *B64D 45/08* (2006.01)
  *B64F 1/00* (2006.01)

(52) U.S. Cl.
  CPC ............... *B64F 1/007* (2013.01); *B64F 1/04* (2013.01); *B63B 2702/12* (2013.01); *B63G 2008/002* (2013.01); *B64C 2201/024* (2013.01); *B64C 2201/18* (2013.01); *B64C 2201/182* (2013.01); *B64C 2201/201* (2013.01); *B64C 2201/205* (2013.01)

(56) References Cited

U.S. PATENT DOCUMENTS

| | | | |
|---|---|---|---|
| 8,453,967 B2* | 6/2013 | Miller | B64F 1/02 244/110 C |
| 2005/0151014 A1* | 7/2005 | McGeer | B64O 25/68 244/120 |
| 2008/0111021 A1* | 5/2008 | Toth | B63G 8/28 244/63 |
| 2017/0137150 A1* | 5/2017 | Conyers | B64F 1/007 |

* cited by examiner

APPARATUS AND METHOD FOR RECOVERING AND LAUNCHING UNMANNED AERIAL VEHICLE

CROSS-REFERENCE TO RELATED APPLICATION

This application claims priority to and the benefit of Korean Patent Application No. 2015-0185480, filed on Dec. 23, 2015, the disclosure of which is incorporated herein by reference in its entirety.

BACKGROUND

1. Field of the Invention

The present invention relates to an apparatus and method for stably recovering and launching an unmanned aerial vehicle.

2. Discussion of Related Art

An unmanned aerial vehicle system that can automatically perform given tasks throughout all areas including land, sea, and air has been highlighted as one of next-generation military weapon systems.

Such an unmanned aerial vehicle is an aircraft that is manufactured to allow a pilot to perform a specific task without being on board, and is operated in conjunction with an independent system or space/ground systems.

In addition, the unmanned aerial vehicle is equipped with various devices (optical, infrared, and radar sensors, etc.) depending on the application fields to perform tasks such as surveillance, reconnaissance, induction of precision attack weapons, communications/information relay, EA/EP, decoy, etc., and has been also developed and commercialized as a precision weapon itself by loading explosives so that it is attracting attention as a major military means in the future.

In order to achieve such land, sea, and air-related systems, a technology that can stably recovery and launch the unmanned aerial vehicle which has completely performed the corresponding task to an underwater vehicle such as an unmanned submarine should be decided first.

That is, a technology that safely brings the unmanned aerial vehicle down in the unmanned submarine and recoveries the unmanned aerial vehicle is more difficult than a technology that launches the unmanned aerial vehicle from the unmanned submarine.

This is because stable recovering is made possible only when the unmanned aerial vehicle flying through the air and the underwater vehicle floating in the sea should be precisely aligned during a recovering operation of the unmanned aerial vehicle.

However, in the marine environment having many variables such as sea breezes or waves, performing a precise control to recovery the unmanned aerial vehicle to the underwater vehicle such as an unmanned submarine is realistically very difficult.

[Patent document 1] JP2007-223491 A

SUMMARY OF THE INVENTION

The present invention is directed to an apparatus and method for stably and efficiently recovering and launching an unmanned aerial vehicle to be recovered and launched in a marine environment with a harsh disturbance condition.

The technical objectives of the inventive concept are not limited to the above disclosure; other objectives may become apparent to those of ordinary skill in the art based on the following descriptions.

According to an aspect of the present invention, there is provided an apparatus for recovering and launching an unmanned aerial vehicle, including: a main body that includes a storage space in which the unmanned aerial vehicle is stored; an inclined platform that forms an inclined surface which is connected between a fixed bar fixed in the main body and a moving bar moved to an opened upper portion of the main body and collides with the unmanned aerial vehicle induced to approach a side of the main body; a band member of which one end is connected to the moving bar and the other end is rolled up in a roll shape and stored in the storage space of the main body; and a driving motor that rotationally drives a rotor circumscribed with the band member in a normal direction or reverse direction, so that the moving bar is moved with respect to the fixed bar, wherein the inclined surface is formed by unfolding the inclined platform, the unmanned aerial vehicle colliding with the inclined surface is recovered to the storage space, and then the inclined platform is folded.

Here, the band member may be made of an elastic material.

Also, the inclined platform may include a plurality of closed-loop type elastic bands of which both ends are respectively connected to the fixed bar and the moving bar.

Also, the inclined platform may include an elastic plate of which both ends are respectively connected to the fixed bar and the moving bar, and through which a plurality of slits penetrate.

Also, the band member may include a rack type band that forms a gear surface gear-engaged with the rotor including a circular gear having a sawtooth portion formed on an outer circumferential surface thereof.

Also, the band member may include a belt type band that forms a rubbed surface circumscribed with the rotor including a circular wheel having a friction surface formed on an outer circumferential surface thereof.

Also, the main body may include a guide stand that guides a linear motion of the band member by restraining both left and right boundaries of the band member.

Also, the main body may include a guide inclined plate that is installed to be inclined at a predetermined angle in front of the rotor and guides the band member together with the moving bar in an oblique direction.

Also, the apparatus for recovering an unmanned aerial vehicle may further include a contact bar that is provided between the guide inclined plate and the rotor, and brought into contact with the band member to achieve direction conversion while the band member passes through the contact bar.

Also, the main body may include a rolled portion in which the end of the band member rolled up in a roll shape is accommodated.

Also, the main body may include a float that is floatable on water surface to recovery and launch the unmanned aerial vehicle and movable in water after recovering and launching the unmanned aerial vehicle.

According to another aspect of the present invention, there is provided a method for recovering an unmanned aerial vehicle, including: opening a cover of a main body so that a storage space of the main body in which the unmanned aerial vehicle is accommodated is exposed; making a driving motor operation-stand by, the driving motor rotationally driving an inclined platform which is connected at its one end to a fixed bar fixed in the main body and connected at the other end to a moving bar moved to an opened upper portion of the main body and a rotor circumscribed with a band member which is connected at its one end to the moving bar; unfolding the inclined platform by a normal direction rotational driving of the driving motor so that an inclined surface with which the unmanned aerial vehicle induced to approach a side of the main body collides is formed; and folding the inclined platform by a reverse direction rotational driving of the driving motor so that the unmanned aerial vehicle colliding with the inclined surface is returned to the storage space.

Here, in the making the driving motor operation-stand by, the other end of the band member connected at its one end to the moving bar may be rolled up in a roll shape and stored in a rolled portion provided in the main body.

Also, the unfolding may be performed by a normal direction rotational driving of the rotor including a circular gear having a sawtooth portion formed on an outer circumferential surface thereof circumscribed with a rack type band including a gear surface formed thereon.

Also, the unfolding may be performed by a normal direction rotational driving of the rotor including a circular wheel having a friction surface formed on an outer circumferential surface thereof circumscribed with a belt type band including a rubbed surface formed thereon.

Also, in the unfolding, the band member may be linearly moved by a guide stand for restraining both left and right boundaries of the band member at the time of a rotational driving of the driving motor, and obliquely moved by a guide inclined plate installed to be inclined at a predetermined angle to the main body.

Also, the band member may be subjected to bending deformation to achieve direction conversion by a contact bar installed between a section in which the band member is linearly moved by the guide stand and a section in which the band member is obliquely moved and guided by the guide inclined plate.

Also, a location of the unmanned aerial vehicle taken off from the main body and flies in an unmanned manner may be confirmed by a GPS signal, the unmanned aerial vehicle of which location is confirmed may be induced to approach the main body by an RF signal, and the unmanned aerial vehicle induced to approach the main body may be controlled to be induced to collide with the inclined platform confirmed by an optical means within a short range.

According to another aspect of the present invention, there is provided a submarine including: the above-described apparatus for recovering and launching an unmanned aerial vehicle.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail. However, the present invention is not limited to the exemplary embodiments disclosed below, but can be implemented in various forms. The following exemplary embodiments are described in order to enable those of ordinary skill in the art to embody and practice the invention. In the following description, well-known functions or constructions are not described in detail if it is determined that they would obscure the invention due to unnecessary detail.

Throughout the drawings, whenever the same element reappears in a subsequent drawing, it is denoted by the same reference numeral.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

As shown in FIGS. 1 to 7, an apparatus 1 for recovering and launching an unmanned aerial vehicle according to a preferred embodiment of the present invention includes a main body 10, an inclined platform 20, a pair of band members 30, and a driving motor 40 so that the unmanned aerial vehicle can be safely recovered and launched in marine conditions with harsh disturbance.

Figure 1:
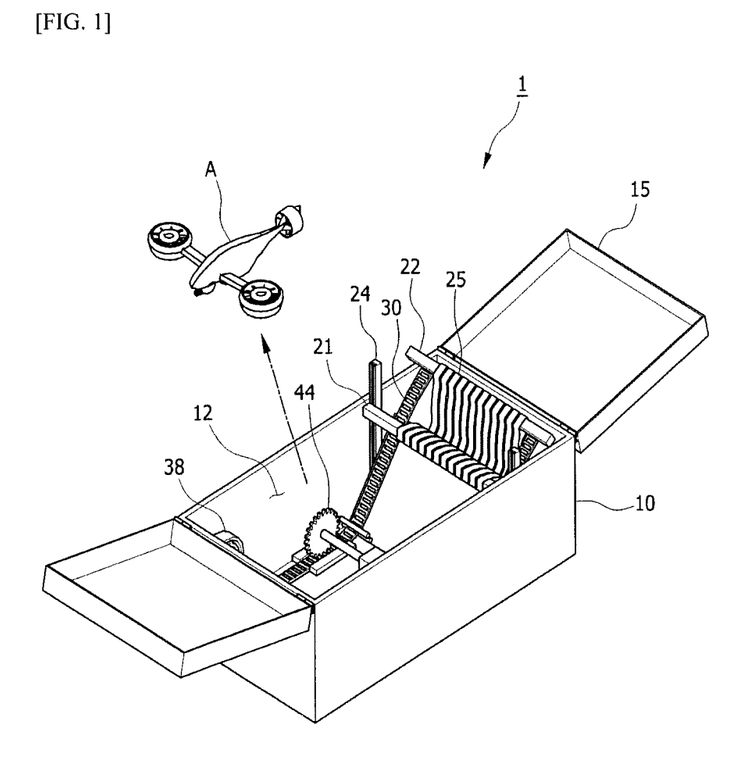
FIG. 1 is a perspective view showing a state in which a hatch cover in an apparatus for recovering and launching an unmanned aerial vehicle according to a preferred embodiment of the present invention is opened so that an unmanned aerial vehicle is launched.
Figure 2:
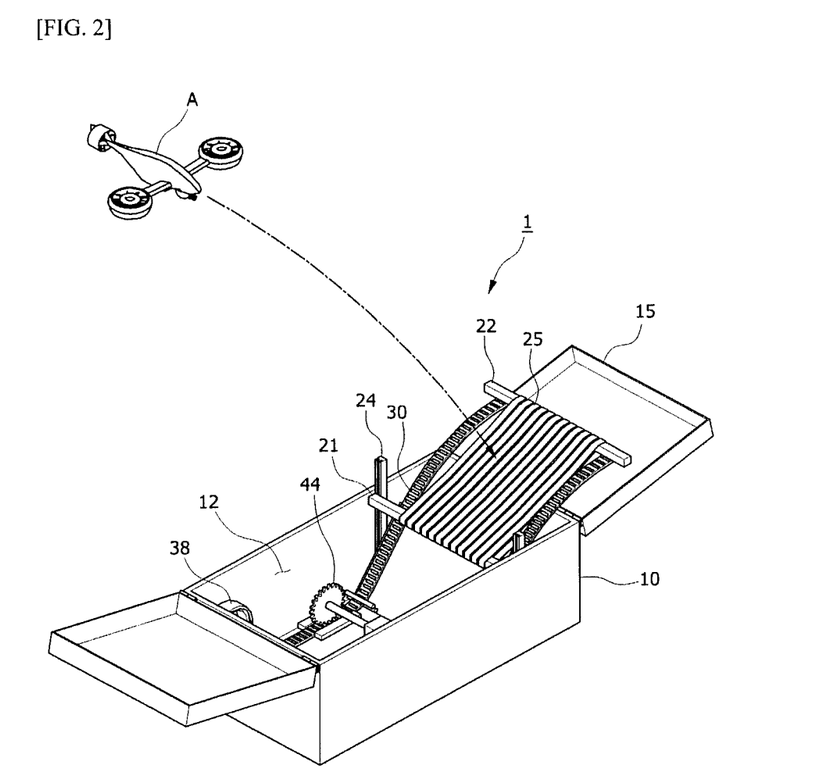
FIG. 2 is a perspective view showing a state in which a hatch cover in an apparatus for recovering and launching an unmanned aerial vehicle according to a preferred embodiment of the present invention is opened so that an unmanned aerial vehicle is recovered.

The main body 10 is equipped with an installation space for installing the inclined platform 20, the pair of band members 30, and the driving motor 40 as well as a storage space 12 for accommodating an unmanned aerial vehicle A to be recovered and launched, and is a floatable receptor to recovery and launch the unmanned aerial vehicle A in a floating state at sea. And the main body 10, which recovers and launches the unmanned aerial vehicle, may submerge under the sea.

In other words, the main body 10 includes a float that is floatable on water surface to recovery and launch the unmanned aerial vehicle and the float is movable in water after recovering and launching the unmanned aerial vehicle.

Such a main body 10 has been shown and described as having a substantially rectangular box shape having a hatch cover 15 to open and close the storage space 12 in which the unmanned aerial vehicle A that is equipped with various devices (optical, infrared, radar sensors, etc.) depending on the application fields is accommodated, but is not limited thereto. For example, the main body may include a floating body having buoyancy so that it can float on the sea.

The main body 10 may be an unmanned or manned submarine operated on or under the sea and may be part of an unmanned or manned submarine, a cargo type vehicle moved on the land, or an RAV (robotic amphibious vehicle) or tank used in an amphibious manner.

At this point, the hatch cover 15 has been shown and described such that a pair of cover members are tipped or closed outward in a rotatable manner by a separate driving means provided in the main body so as to open and close an opened upper portion of the main body 10, but is not limited thereto. For example, the hatch cover 15 may open and close the opened upper portion of the main body in a slidable manner.

The storage space 12 may allow the opened upper portion of the main body 10 to be opened and closed by the hatch cover 15 capable of performing opening/closing operations, so that the unmanned aerial vehicle A is isolated from the outside by covering the hatch cover 15 in a state in which the unmanned aerial vehicle A is accommodated in the storage space 12, thereby protecting the unmanned aerial vehicle A from the external environment. In addition, the storage space 12 may be exposed to the outside by the opening operation of the hatch cover 15 in order to launch or recovery the unmanned aerial vehicle to or from the outside.

Figure 3:
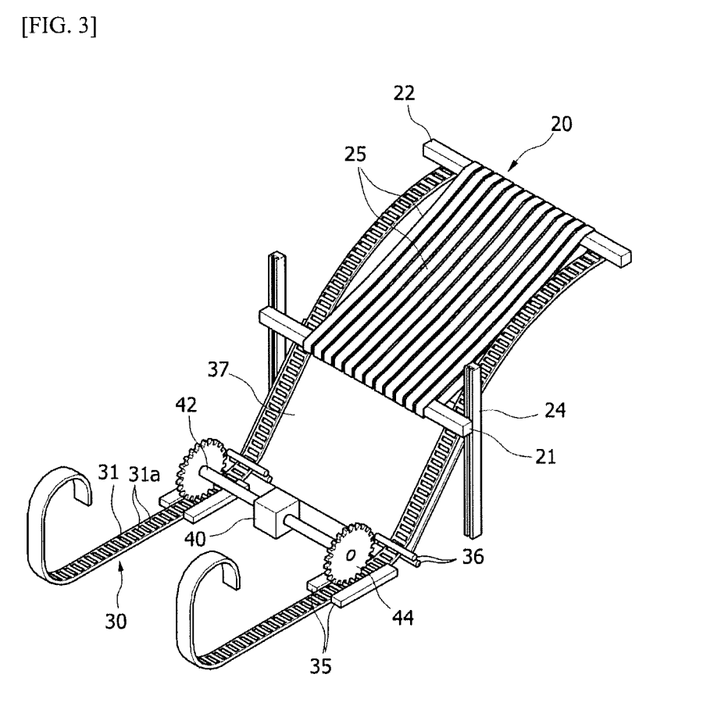
FIG. 3 is a perspective view showing an inclined platform provided in an apparatus for recovering and launching an unmanned aerial vehicle according to a preferred embodiment of the present invention.

The inclined platform 20 is provided such that both ends of the inclined platform 20 are connected between a fixed bar 21 fixed in the main body 10 and a moving bar 22 provided movable toward the opened upper portion of the main body 10 to form an inclined surface with which the unmanned aerial vehicle A induced to approach toward the main body 10 side after flying of the unmanned aerial vehicle A collides.

The inclined platform 20 is connected at its one end to the fixed bar 21, and connected at the other end to the moving bar 22 moved to be located relatively higher than the fixed bar 21, thereby forming a seating surface which is inclined at a predetermined angle with which the unmanned aerial vehicle A can safely collide when the inclined platform 20 is unfolded according to the movement of the moving bar 22.

At this point, the inclined platform 20 may be preferably made of an elastic material such as rubber to absorb the collision shock when colliding with the unmanned aerial vehicle A so that the folding and unfolding of the inclined platform 20 may be facilitated while minimizing breakage and damage of the unmanned aerial vehicle A.

Figures 4A, 4B:
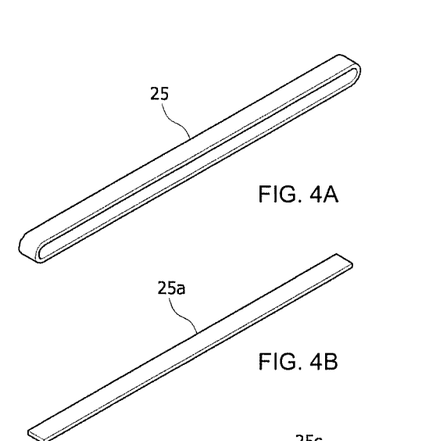
FIGS. 4A to 4C are examples of an inclined platform provided in an apparatus for recovering and launching an unmanned aerial vehicle according to a preferred embodiment of the present invention.
Figure 4C:
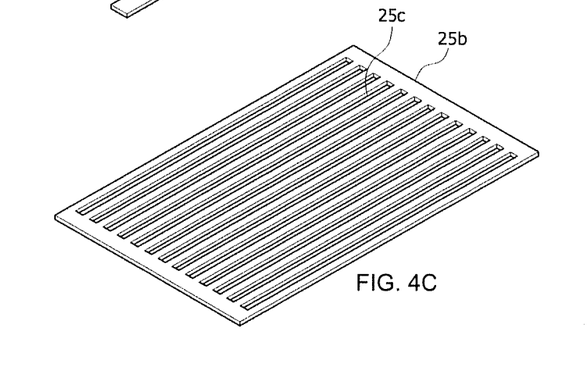

Such an inclined platform 20 may include a plurality of closed-loop type elastic bands 25 or a plurality of belt type elastic bands 25a of which both ends are connected to the fixed bar 21 and the moving bar 22 which are arranged to have different heights from each other, respectively, or include an elastic plate 25b through which a plurality of slits 25c penetrate.

Accordingly, the plurality of closed-loop type elastic bands 25 or the plurality of belt type elastic bands 25a of which both ends are connected between the fixed bar 21 and the moving bar 22 may be arranged adjacent to each other at predetermined intervals to form a wide inclined surface, and the wide inclined surface may be also obtained by the elastic plate 25b through which the plurality of slits 25c penetrate, so that the inclined platform 20 may absorb the shock by an elastic force when colliding with the unmanned aerial vehicle A, thereby recovering the unmanned aerial vehicle A without damage to both the unmanned aerial vehicle A and the inclined surface.

Therefore, only by simply colliding the unmanned aerial vehicle A induced to approach the main body side with the inclined platform 20 without a precise control in a state in which the unmanned aerial vehicle A approaches the main body 10 with a short distance therebetween, the unmanned aerial vehicle A may be safely recovered to the storage space 12 of the main body 10.

In addition, the inclined platform 20 may include the plurality of elastic bands 25 or 25a arranged adjacent to each other or include the slits 25c penetrating the elastic plate 25b, and thereby minimize a wind resistance while sea breeze naturally passes through the inclined platform 20 in the marine environment and minimize the movement of the main body 10 when recovering the unmanned aerial vehicle A, and therefore an operation of recovering the unmanned aerial vehicle A at sea may be more precisely performed.

The fixed bar 21 may include a horizontal member with a predetermined length which is connected at its both ends to a pair of vertical stands 24 fixedly installed perpendicular to a bottom surface of the main body 10 and horizontally arranged, and the moving bar 22 may include a horizontal member with a predetermined length which is connected at its both ends to ends of the pair of band members 30 and horizontally arranged.

At this point, the fixed bar 21 may be assembled to the pair of vertical stands 24 to allow height adjustment, so that the fixed bar 21 may be located lower than the moving bar 22 when the inclined platform 20 is unfolded, and the moving bar 22 may be moved adjacent to the fixed bar 21 when the inclined platform 20 is folded.

The pair of band members 30 may include belt type elastic bands with a predetermined length in such a manner that an end of each of the pair of band members 30 may be respectively connected to the both ends of the moving bar 22 and the other end thereof may be wound in a substantially roll shape and stored in the storage space 12 of the main body 10.

Such band members 30 may preferably include thin plate type belt members so as to be made of a resin or a metallic material so that bending deformation of the band members 30 may be facilitated.

The driving motor 40 may provide power for reciprocatingly moving the moving bar 22 so that the moving bar 22 may be moved away from or approach the fixed bar 21 whose position is fixed, and include a motor member that provides a rotational driving force for rotatably driving a pair of rotors 44 provided at both ends of a driving shaft 42 in a normal direction or a reverse direction so that the pair of rotors 44 may be circumscribed with the pair of band members 30.

Here, the driving motor 40 has been shown and described as having the pair of rotors 44 circumscribed with the pair of band members 30 at the both ends of the driving shaft 42, but is not limited thereto. For example, the driving motor 40 may be provided such that a rotor may be respectively mounted in driving shafts of two driving motors to rotatably drive the band members and the rotors.

Figure 5:
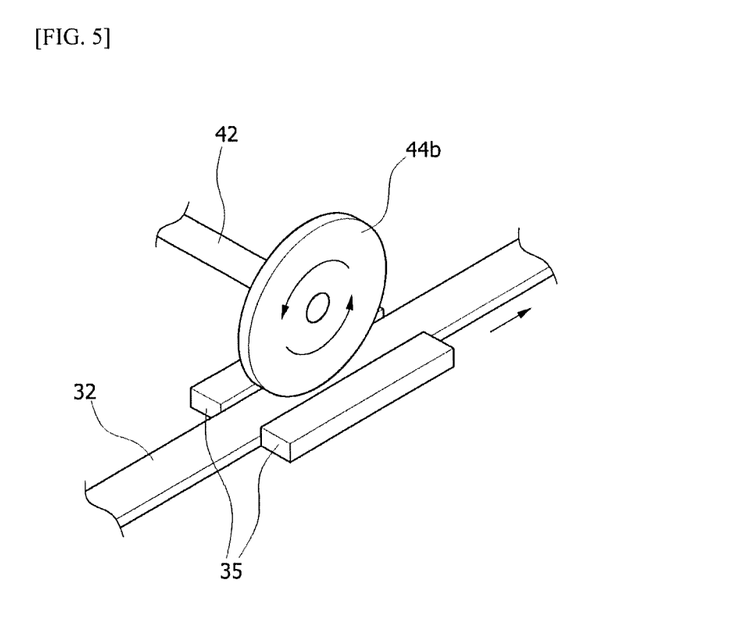
FIG. 5 is a perspective view showing another operating state between a rotor and a band member in an apparatus for recovering and launching an unmanned aerial vehicle according to a preferred embodiment of the present invention.

The pair of band members 30 may include a pair of rack type bands 31 each including a gear surface 31a which is gear-engaged with the rotor 44 including a circular gear 44a having a sawtooth portion formed on an outer circumferential surface thereof, or include a pair of belt type bands 32 each including a rubbed surface which is circumscribed with the rotor 44 including a circular wheel 44b having a friction surface formed on an outer circumferential surface thereof.

In addition, left and right boundaries of each of the pair of band members 30 may be preferably restrained by guide stands 35 provided at the bottom surface of the main body 10, so that a reciprocating motion for allowing the moving bar 22 to be moved away from or approach the fixed bar 21 is more smoothly performed, thereby guiding a linear motion without derailment.

Figure 6A:
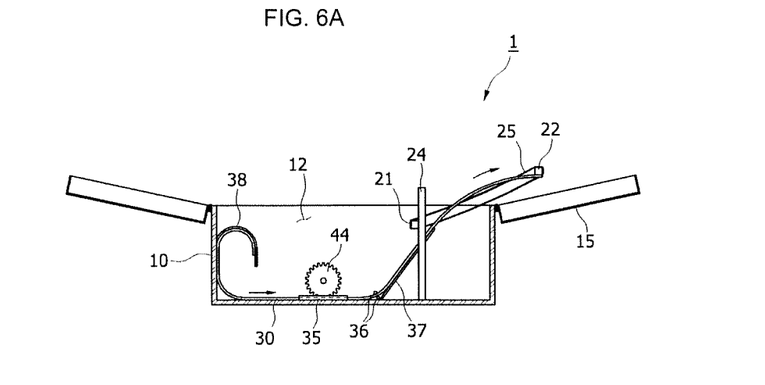
FIGS. 6A and 6B are cross-sectional views showing states in which an apparatus for recovering and launching an unmanned aerial vehicle according to a preferred embodiment of the present invention is unfolded and folded.
Figure 6B:
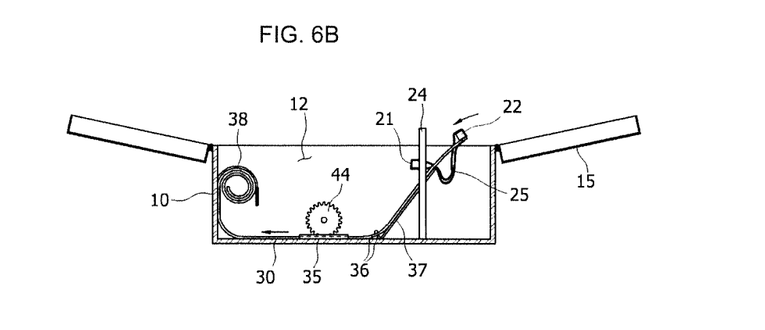

The main body 10 may include a guide inclined plate 37 that is installed in front of the rotor 44 to be inclined at a predetermined angle and guides the pair of band members 30 in an oblique direction while a lower surface of each of the pair of band members 30 is brought into contact with the guide inclined plate 37, so that a lower end of each of the pair of band members 30 which is linearly moved by a rotational force of the rotor 44 may be brought into contact with or adjacent to the bottom surface of the main body 10 and an upper end of each of the pair of band members 30 may be located in the opened upper portion of the main body 10, and thereby a linear guide movement may be smoothly performed by the guide inclined plate 37 inclined at a predetermined angle.

Contact bars 36 may be preferably installed to be parallel to the bottom surface of the main body 10 between the guide inclined plate 37 and the rotor 44. Here, the pair of band members 30 may be brought into contact with the contact bars 36 while passing through the contact bars 36 so that bending deformation of the pair of band members 30 may be facilitated when the pair of band members 30 horizontally moved along the bottom surface of the main body 10 are obliquely moved along a surface of the guide inclined plate 37.

Meanwhile, a rolled portion 38 may be provided in the storage space 12 of the main body 10. Here, in the rolled portion 38, ends of the pair of band members 30 which are returned backward to the storage space 12 of the main body 10 at the time of a folding operation of the inclined platform 20 in which the pair of band members 30 are returned backward so that the moving bar 22 approaches the fixed bar 21 may be smoothly rolled up and stored in a roll shape.

At this point, the rolled portion 38 may be formed in a box shape with an arc-shaped cross-section of which a lower portion is opened, so that the other ends of the pair of band members 30 which are returned backward at the time of the folding operation of the inclined platform 20 may be smoothly rolled up.

When recovering the unmanned aerial vehicle A using the apparatus 1 for recovering the unmanned aerial vehicle A having the above-described components, the storage space 12 of the main body 10 in which the unmanned aerial vehicle A is accommodated and stored may be first opened by the hatch cover 15 capable of performing opening/closing operations, and exposed to the outside.

At this point, the inclined platform 20 provided between the fixed bar 21 fixed in the main body 10 and the moving bar 22 of which one end is connected to the pair of band members 30 may be folded by an approach between the fixed bar 21 and the moving bar 22, and stand by.

Next, the other ends of the pair of band members 30 of which ends are connected to the both ends of the moving bar 22 may be rolled up in a roll shape in the rolled portion 38 provided in the storage space 12 of the main body 10, and stand by.

Figure 7:
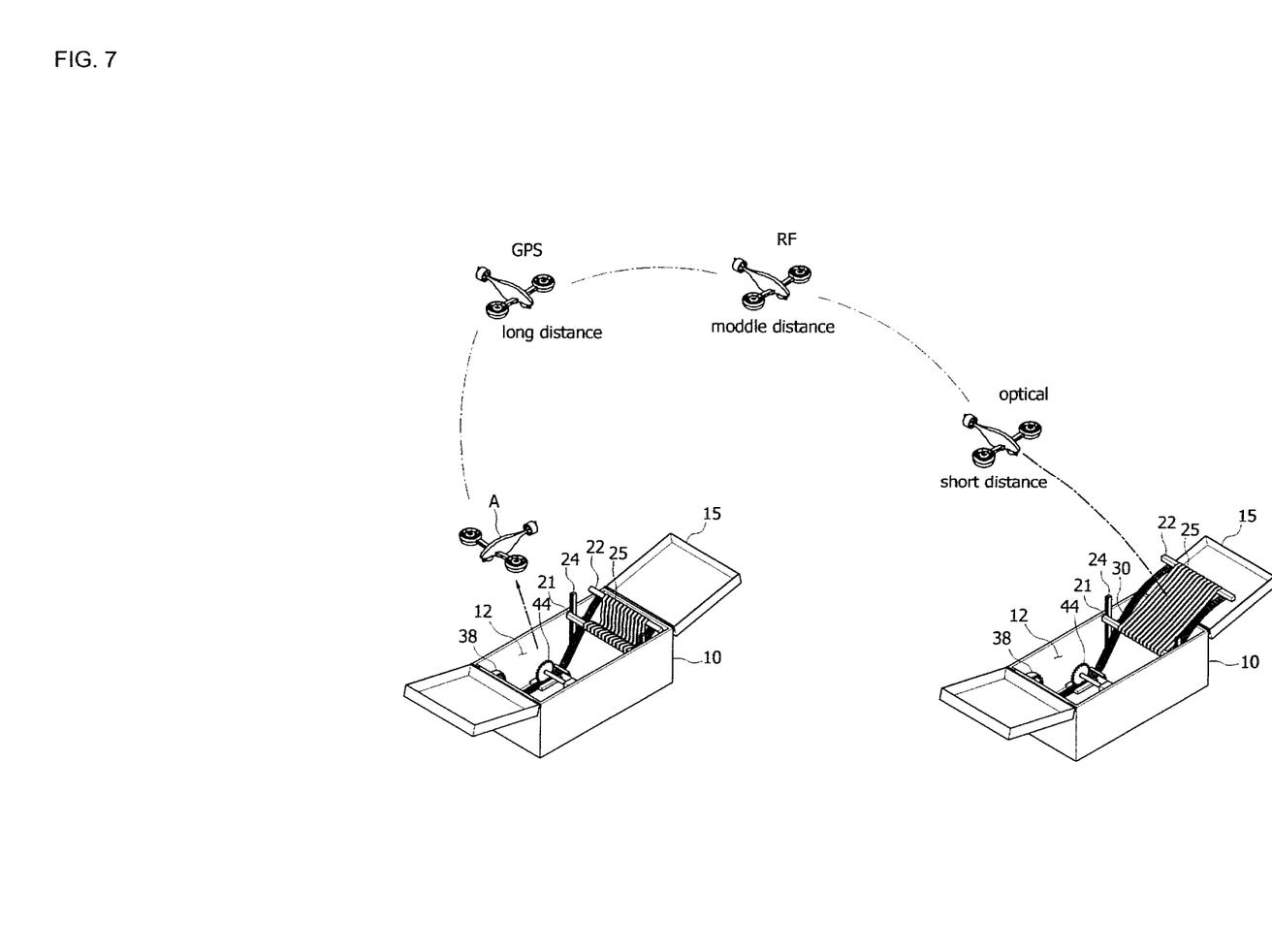
FIG. 7 is a view showing an operating state of an apparatus for recovering and launching an unmanned aerial vehicle according to a preferred embodiment of the present invention.

In this state, the location of the unmanned aerial vehicle A which is taken off from the main body 10 and flies in an unmanned manner may be confirmed by a GPS signal at a distance, and the unmanned aerial vehicle A whose location is confirmed may be induced to a middle range adjacent to the main body 10 by an RF signal of a controller provided in the main body 10. Next, the unmanned aerial vehicle A induced to approach the vicinity of the main body 10 may be controlled to be recovered and launched to the storage space 12 of the main body 10 by an optical means such as a camera within a short range.

That is, when the unmanned aerial vehicle A approaches the main body 10 within a close range, the rotor 44 circumscribed with the pair of band members 30 of which ends are connected to the moving bar 22 may be rotationally driven in a normal direction (in a counterclockwise direction on the drawing) by a normal direction rotational driving of the driving motor 40 provided in the main body 10, and the pair of band members 30 may be linearly guided and moved by the guide stands 35 by a rotational driving force of the rotor 44 and obliquely moved to the upper portion side of the main body 10 while being brought into contact with the guide inclined plate 37.

In this case, the moving bar 22 may be moved away from the fixed bar 21, and therefore the inclined platform 20 of which both ends are connected between the moving bar 22 and the fixed bar 21 may be unfolded so as to be switched from a folded state to an unfolded state, thereby forming the inclined surface with which the unmanned aerial vehicle A induced to approach the main body 10 side collides.

Accordingly, the inclined surface may be confirmed by the optical means such as a camera provided in the unmanned aerial vehicle A which is induced to approach the main body 10 side within a close range, and then the unmanned aerial vehicle A may be landed so as to collide with the inclined platform 20.

At this point, since the inclined platform 20 includes an elastic band made of a rubber material, the inclined platform 20 may absorb the collision shock when colliding with the unmanned aerial vehicle A, thereby preventing breakage and damage of the unmanned aerial vehicle A and the inclined platform 20.

Here, the inclination of the inclined surface formed by the inclined platform 20 may be preferably set as an inclination of a degree in which the unmanned aerial vehicle A safely slides after the collision in consideration of both a frictional coefficient according to the elastic material and a weight of the unmanned aerial vehicle A.

At this point, the inclination of the inclined surface may be easily adjusted by raising or lowering a vertical height of the fixed bar 21 installed to be parallel to the vertical stands 24.

Meanwhile, when the unmanned aerial vehicle A collides with the inclined platform 20, falls down to the storage space 12, and then is accommodated in the storage space 12 of the main body 10, the pair of band members 30 may be returned backward by a reverse direction rotational driving of the driving motor 40 so that the moving bar 22 may be returned and moved to the fixed bar 21 side, and thereby the inclined platform 20 may be folded to an initial state.

The operation of moving the pair of band members 30 together with the moving bar 22 by the normal or reverse direction rotational force of the rotor 44 circumscribed with the pair of band members 30 by the rotational driving of the driving motor 40 may be performed by the rotational driving of the rotor 44 that includes the circular gear 44a having the sawtooth portion formed on the outer circumferential surface circumscribed with the pair of band members 30 such as the rack type bands 31 having the gear surface formed on the upper surface thereof, or performed by the rotational driving of the rotor 44 that includes the circular wheel 44b having the friction surface formed on the outer circumferential surface circumscribed with the belt type bands 32 having the rubbed surface formed thereon.

In addition, the pair of band members 30 moved at the time of the rotational driving of the driving motor 40 may be linearly moved by the guide stands 35 for restraining both the left and right boundaries of the pair of band members 30 without derailment, and obliquely moved to the upper portion side of the main body 10 by the guide inclined plate 37 installed to be inclined at a predetermined angle to the main body 10.

At this point, the pair of band members 30 passing between a section in which they are moved linearly by the guide stands 35 and a section in which they are obliquely moved and guided by the guide inclined plate 37 may achieve direction conversion without being caught while being naturally subjected to bending deformation by the contact bars 36 installed between the sections.

The other ends of the pair of band members 30 which are returned backward when the inclined platform 20 is folded may be rolled up in a roll shape by the rolled portion 38 provided in the main body 10, thereby increasing the space utilization of the limited storage space 12 of the main body 10.

Finally, when the inclined platform 20 and the moving bar 22 enter into the storage space 12 of the main body 10, the opened upper portion of the main body 10 may be covered by closing the opened hatch cover 15, thereby completing the operation of recovering the unmanned aerial vehicle A.

According to the above-described present invention, there are the following advantages.

(1) The unmanned aerial vehicle induced to approach the main body side may collide with the inclined platform that is unfolded to form the inclined surface, and then fall down to and be returned to the storage space of the main body, thereby stably recovering the unmanned aerial vehicle in a harsh marine environment.

(2) The inclined surface with which the unmanned aerial vehicle induced to approach the main body side collides may include an elastic band, and thus the inclined platform may absorb the collision shock at the time of a collision between the inclined platform and the unmanned aerial vehicle, thereby minimizing breakage and damage.

(3) The other end of the pair of band members which unfold and fold the inclined platform may be rolled up in a roll shape and stored in the main body, thereby reducing the occupation area while maximally utilizing the limited storage space of the main body.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for recovering and launching an unmanned aerial vehicle, comprising:
    a main body that includes a storage space in which the unmanned aerial vehicle is stored;
    an inclined platform that forms an inclined surface which is connected between a fixed bar fixed in the main body and a moving bar moved to an opened upper portion of the main body and collides with the unmanned aerial vehicle induced to approach a side of the main body;
    a band member of which one end is connected to the moving bar and the other end is rolled up in a roll shape and stored in the storage space of the main body; and
    a driving motor that rotationally drives a rotor circumscribed with the band member in a normal direction or reverse direction, so that the moving bar is moved with respect to the fixed bar,
    wherein the inclined surface is formed by unfolding the inclined platform, the unmanned aerial vehicle colliding with the inclined surface is recovered to the storage space, and then the inclined platform is folded.

2. The apparatus for recovering and launching an unmanned aerial vehicle of claim 1, wherein the band member is made of an elastic material.

3. The apparatus for recovering and launching an unmanned aerial vehicle of claim 1, wherein the inclined platform includes a plurality of closed-loop type elastic bands of which both ends are respectively connected to the fixed bar and the moving bar.

4. The apparatus for recovering and launching an unmanned aerial vehicle of claim 1, wherein the inclined platform includes an elastic plate of which both ends are respectively connected to the fixed bar and the moving bar, and through which a plurality of slits penetrate.

5. The apparatus for recovering and launching an unmanned aerial vehicle of claim 1, wherein the band member includes a rack type band that forms a gear surface gear-engaged with the rotor including a circular gear having a sawtooth portion formed on an outer circumferential surface thereof.

6. The apparatus for recovering an unmanned aerial vehicle of claim 1, wherein the band member includes a belt type band that forms a rubbed surface circumscribed with the rotor including a circular wheel having a friction surface formed on an outer circumferential surface thereof.

7. The apparatus for recovering and launching an unmanned aerial vehicle of claim 1, wherein the main body includes a guide stand that guides a linear motion of the band member by restraining both left and right boundaries of the band member.

8. The apparatus for recovering and launching an unmanned aerial vehicle of claim 1, wherein the main body includes a guide inclined plate that is installed to be inclined at a predetermined angle in front of the rotor and guides the band member together with the moving bar in an oblique direction.

9. The apparatus for recovering and launching an unmanned aerial vehicle of claim 8, further comprising:
    a contact bar that is provided between the guide inclined plate and the rotor, and brought into contact with the band member to achieve direction conversion while the band member passes through the contact bar.

10. The apparatus for recovering and launching an unmanned aerial vehicle of claim 1, wherein the main body includes a rolled portion in which the end of the band member rolled up in a roll shape is accommodated.

11. The apparatus for recovering and launching an unmanned aerial vehicle of claim 1, wherein the main body includes a float that is floatable on water surface to recovery and launch the unmanned aerial vehicle and the float is movable in water after recovering and launching the unmanned aerial vehicle.

12. A method for recovering an unmanned aerial vehicle, comprising:
opening a cover of a main body so that a storage space of the main body in which the unmanned aerial vehicle is accommodated is exposed;
making a driving motor operation-stand by, the driving motor rotationally driving an inclined platform which is connected at its one end to a fixed bar fixed in the main body and connected at the other end to a moving bar moved to an opened upper portion of the main body and a rotor circumscribed with a band member which is connected at its one end to the moving bar;
unfolding the inclined platform by a normal direction rotational driving of the driving motor so that an inclined surface with which the unmanned aerial vehicle induced to approach a side of the main body collides is formed; and
folding the inclined platform by a reverse direction rotational driving of the driving motor so that the unmanned aerial vehicle colliding with the inclined surface is returned to the storage space.

13. The method for recovering an unmanned aerial vehicle of claim 12, wherein, in the making the driving motor operation-stand by, the other end of the band member connected at its one end to the moving bar is rolled up in a roll shape and stored in a rolled portion provided in the main body.

14. The method for recovering an unmanned aerial vehicle of claim 12, wherein the unfolding is performed by a normal direction rotational driving of the rotor including a circular gear having a sawtooth portion formed on an outer circumferential surface thereof circumscribed with the a rack type band including a gear surface formed thereon.

15. The method for recovering an unmanned aerial vehicle of claim 12, wherein the unfolding is performed by a normal direction rotational driving of the rotor including a circular wheel having a friction surface formed on an outer circumferential surface thereof circumscribed with a belt type band including a rubbed surface formed thereon.

16. The method for recovering an unmanned aerial vehicle of claim 12, wherein, in the unfolding, the band member is linearly moved by a guide stand for restraining both left and right boundaries of the band member at the time of a rotational driving of the driving motor, and obliquely moved by a guide inclined plate installed to be inclined at a predetermined angle to the main body.

17. The method for recovering an unmanned aerial vehicle of claim 16, wherein the band member is subjected to bending deformation to achieve direction conversion by a contact bar installed between a section in which the band member is linearly moved by the guide stand and a section in which the band member is obliquely moved and guided by the guide inclined plate.

18. The method for recovering an unmanned aerial vehicle of claim 12, wherein a location of the unmanned aerial vehicle taken off from the main body and flies in an unmanned manner is confirmed by a GPS signal, the unmanned aerial vehicle of which location is confirmed is induced to approach the main body by an RF signal, and the unmanned aerial vehicle induced to approach the main body is controlled to be induced to collide with the inclined platform confirmed by an optical means within a short range.

19. Submarine comprising the apparatus for recovering and launching an unmanned aerial vehicle of claim 1.

* * * * *